US006401389B1

(12) United States Patent
Mount et al.

(10) Patent No.: US 6,401,389 B1
(45) Date of Patent: Jun. 11, 2002

(54) AUTOMATIC PLANT WATERING SYSTEM AND METHOD

(76) Inventors: Randy A. Mount, 105 Tuxworth Rd., Centerville, OH (US) 45458; Don Carone, 2127 E. Rahn Rd., Kettering, OH (US) 45440; Ralph F. Conley, Jr., 5571 Shepard Rd., Miamisburg, OH (US) 45342

( * ) Notice: Subject to any disclaimer, the term of this patent is extended or adjusted under 35 U.S.C. 154(b) by 0 days.

(21) Appl. No.: 09/422,597

(22) Filed: Oct. 21, 1999

(51) Int. Cl.[7] .............................................. A01G 25/00
(52) U.S. Cl. ........................................... 47/79; 47/65.5
(58) Field of Search .......................... 47/79, 65.5, 40.5, 47/66.1, 66.5, 66.7, 85, 48.5, 41.01

(56) References Cited

U.S. PATENT DOCUMENTS

| | | | |
|---|---|---|---|
| 3,137,969 A | * 6/1964 | Sokol | 47/48.5 |
| 3,783,555 A | 1/1974 | Peters | |
| 3,912,165 A | * 10/1975 | Pira | 239/11 |
| 4,040,207 A | 8/1977 | Lancaster | |
| 4,060,934 A | * 12/1977 | skaggs | 47/79 |
| 4,157,770 A | 6/1979 | Roos | |
| 4,171,716 A | 10/1979 | Szabo et al. | |
| 4,183,175 A | 1/1980 | Magee | |
| 4,285,164 A | 8/1981 | Moore | |
| 4,327,630 A | 5/1982 | Brassine | |
| 4,329,815 A | 5/1982 | Secrest | |
| 4,356,665 A | 11/1982 | de Oliveira | |
| 4,467,561 A | 8/1984 | Tsuchiya | |
| 4,578,897 A | * 4/1986 | Pazar et al. | 47/48.5 |
| 4,581,848 A | 4/1986 | Krober | |
| 4,603,506 A | 8/1986 | Powell, Jr. | |
| 4,782,627 A | * 11/1988 | Hauk | 47/48.5 |
| 4,794,728 A | 1/1989 | Tsukada et al. | |
| 4,825,591 A | 5/1989 | Han | |
| 4,864,771 A | 9/1989 | Fah | |
| 4,916,858 A | 4/1990 | Hobson | |
| 4,975,251 A | * 12/1990 | Saceman | 422/124 |
| 4,993,186 A | 2/1991 | Immonen | |
| 5,037,583 A | 8/1991 | Hand | |
| 5,076,010 A | 12/1991 | Rollins | |
| 5,097,626 A | * 3/1992 | Mordoch | 47/79 |
| 5,209,015 A | * 5/1993 | Filippi | 47/79 |
| 5,228,107 A | 7/1993 | Marino | |
| 5,250,232 A | 10/1993 | Pepper et al. | |
| D342,463 S | 12/1993 | Brooks | |
| 5,403,223 A | 4/1995 | Daneshvar | |
| RE35,153 E | 2/1996 | Chiu | |
| 5,502,924 A | 4/1996 | Lee | |
| 5,557,885 A | 9/1996 | Sledge | |
| 5,669,178 A | * 9/1997 | Petrovic | 47/40.5 |
| 6,006,471 A | * 12/1999 | Sun | 47/69 |
| 6,233,871 B1 | * 5/2001 | Ho | 47/79 |

* cited by examiner

Primary Examiner—Charles T. Jordan
Assistant Examiner—Judith A. Nelson
(74) Attorney, Agent, or Firm—Jacox, Meckstroth & Jenkins

(57) ABSTRACT

This invention relates to an automatic plant watering system and method having a container for receiving a plant. The container has a dividing wall which divides the container into a plant-receiving area and a fluid container area for receiving a fluid container. When the fluid container is mounted in the fluid container receiving area, an actuator on the container actuates and opens a flapper valve so that fluid may pass from the container into the plant-receiving area. The container is situated a predetermined distance in the container-receiving area which defines the amount of water to be provided and maintained in the plant-receiving area.

51 Claims, 6 Drawing Sheets

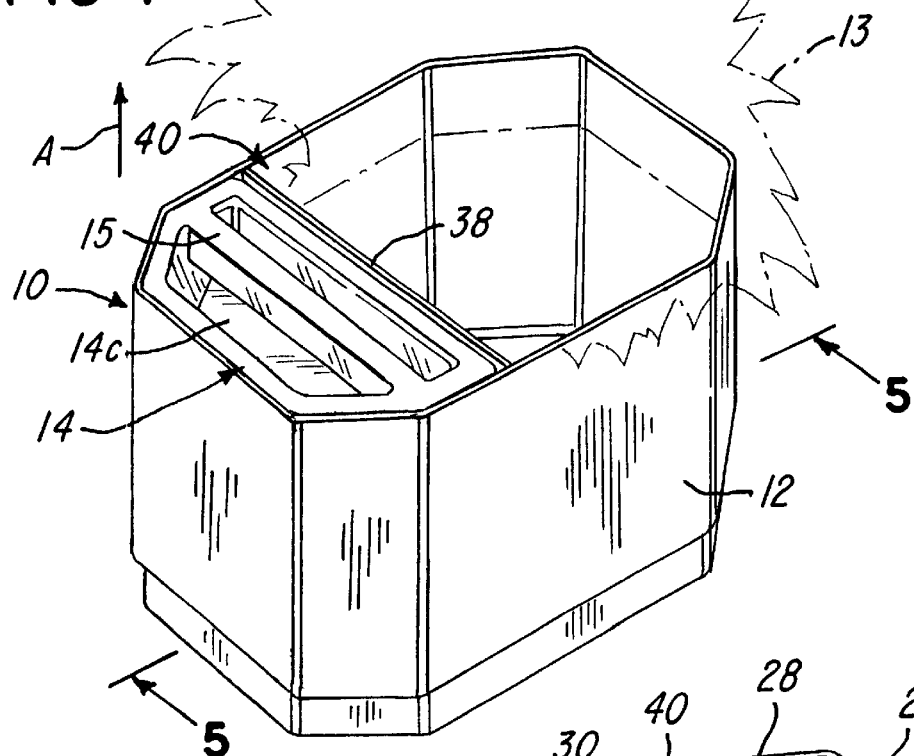
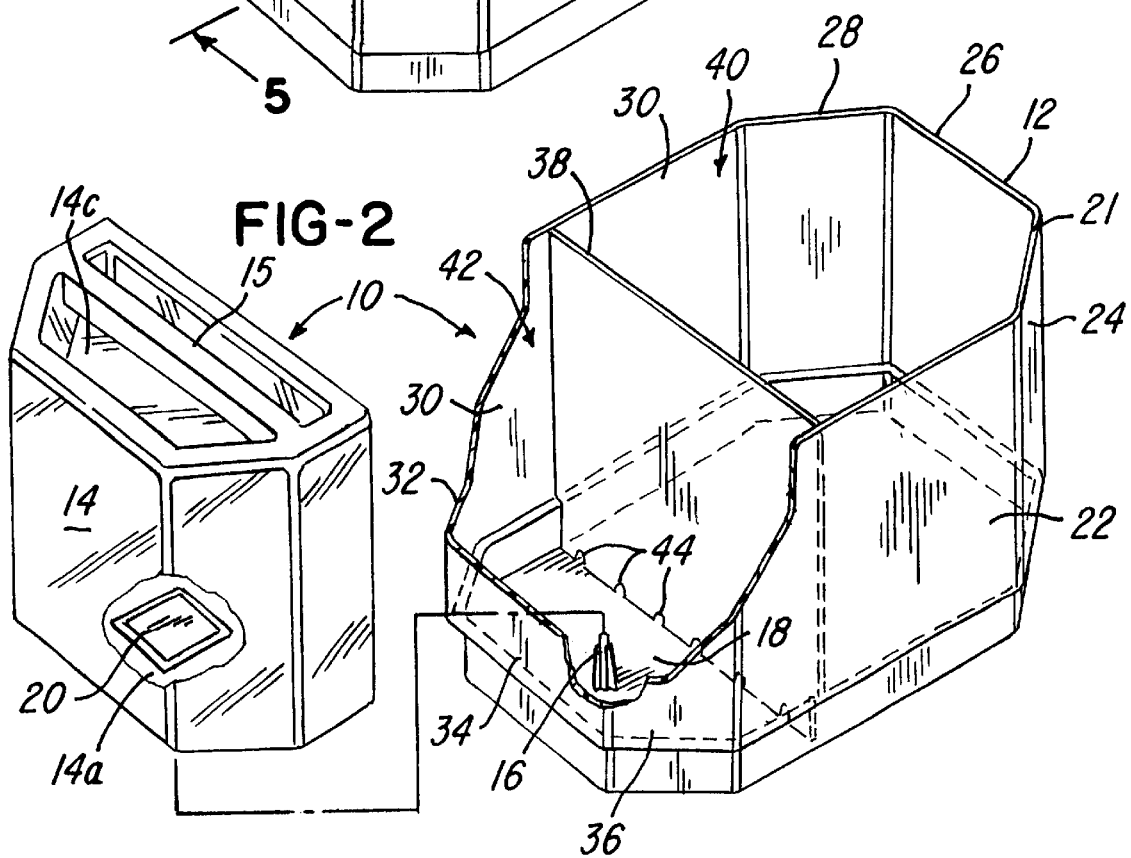

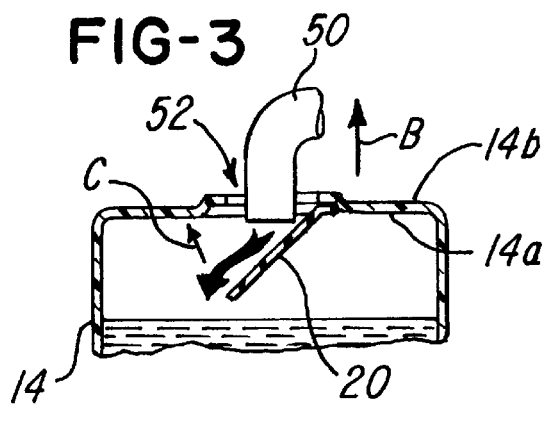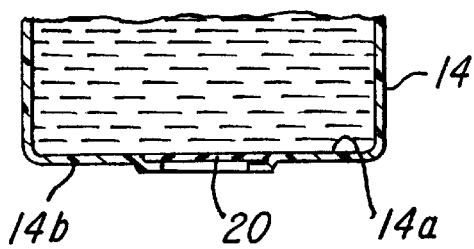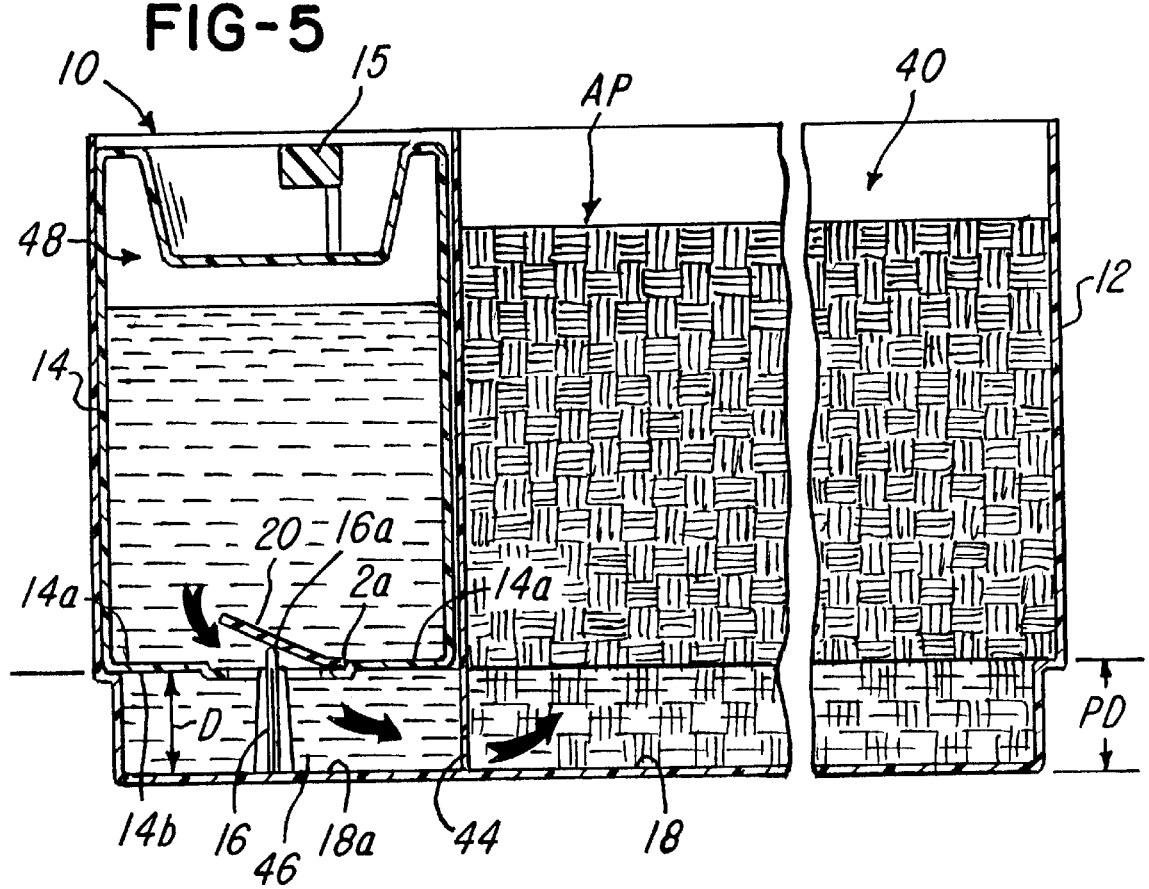

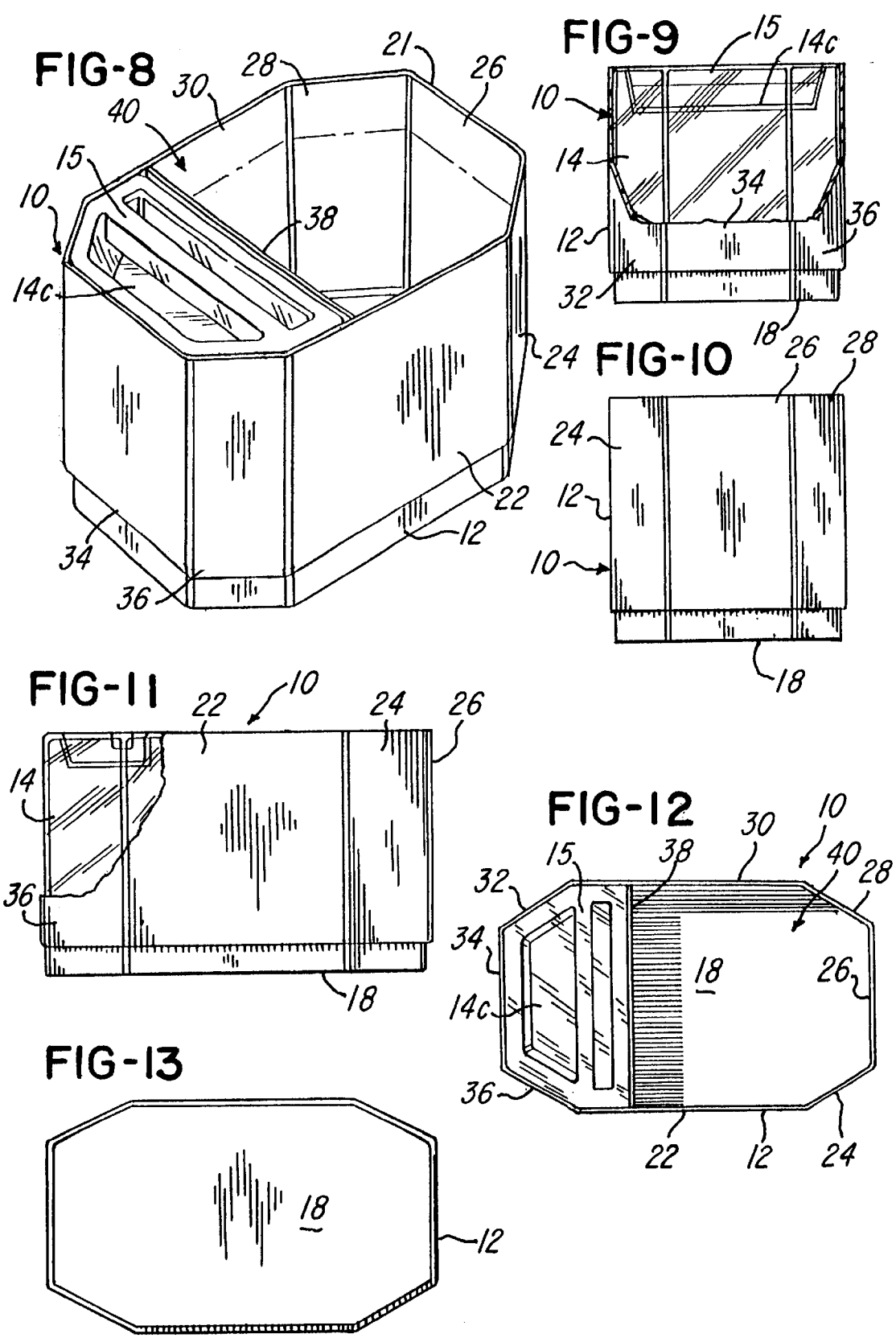

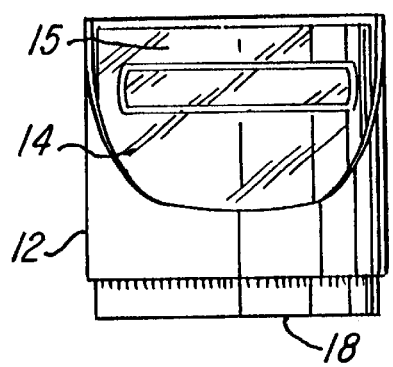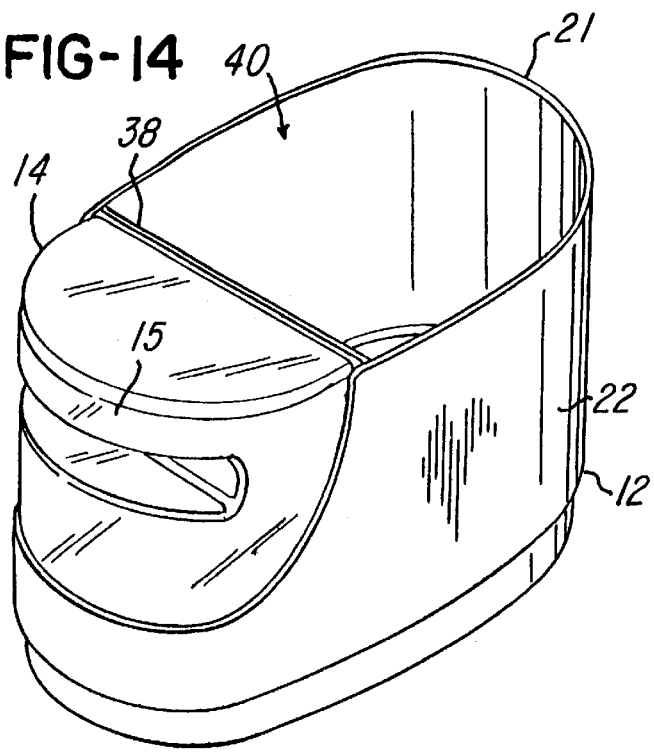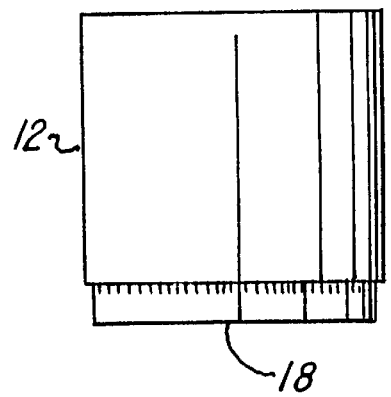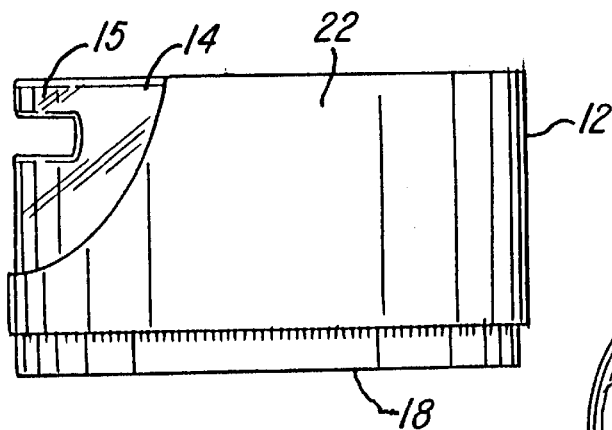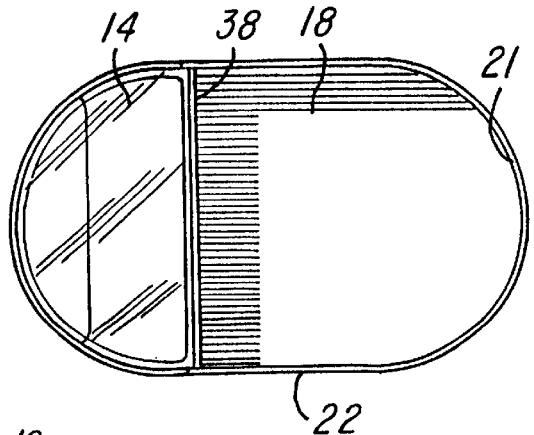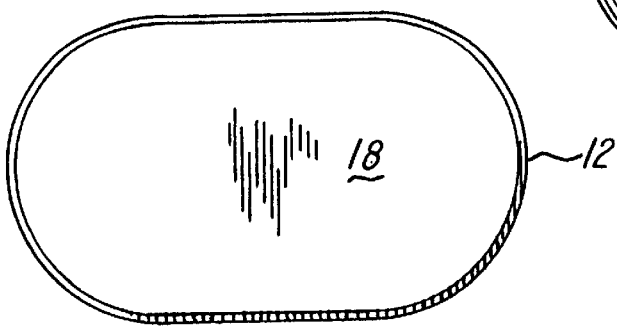

AUTOMATIC PLANT WATERING SYSTEM AND METHOD

FIELD OF THE INVENTION

This invention relates to a plant watering system and, more particularly, a plant watering system having a container for receiving a fluid container having a valve which becomes actuated to hydrate plants situated in a plant-receiving area of the container with a predetermined amount of water.

DESCRIPTION OF THE RELATED

Water needs differ from plant to plant and are dependent upon many factors, including atmospheric environment and the type of soil used. Determination of an individual plant's water needs is not a simple task for either the casual or professional plant grower. Also, a significant amount of time is required for watering conventional plants, particularly when numerous plants are involved, such as in a greenhouse. For a casual grower, it may sometimes be inconvenient to water plants, such as during periods when no one is available to tend to the plants. Many owners find it necessary to engage another's services in caring for the plants during periods of absence, or they risk loss of a plant due to lack of water. It is also not uncommon that the required watering of a plant is simply unintentionally overlooked or forgotten from day to day with the result being an unintentional or undesired death of the plant.

Some prior art planters provide some self-watering by transportation of water from a separate reservoir to the surrounding soil by wicks, sponges or other water-absorbent media are generally known. Another method of water transfer is by capillary action of water from a reservoir to the soil surrounding the plant, such as the use of the devices described in U.S. Pat. Nos. 3,866,351 and 2,713,753. These devices do not assure that proper amount of water is transferred to the soil.

Devices for growing plants which include not only a separate water reservoir but also access to such reservoir by plant's roots are also generally known, such as the devices described in U.S. Pat. Nos. 3,823,508; 2,713,749; 2,722,779; 3,660,933 and 954,550. Other devices, such as the device shown in U.S. Pat. Nos. 4,183,175; 4,993,186; 5,502,924 and D-342,463, are also attempts to provide watering or hydrating systems.

A problem with the devices of the past is that they failed to provide a convenient and simple system and method for replenishing fluid in a fluid container which can be mounted in a plant container to automatically water the plants.

SUMMARY OF THE INVENTION

It is, therefore, a primary object of the invention to provide an automatic plant watering system method and system which comprises a simple two-piece construction and which provides a fluid container having a valve which may be used for refilling and which is used to permit fluid to flow from the container into a plant-receiving area of a plant container. In one aspect, this invention comprises An automatic plant watering system consisting of a container comprising a container bottom and a plurality of walls defining a first area for receiving soil and a second area for receiving a fluid container, the plurality of walls comprising a dividing wall for separating a first area from a second area, the dividing wall comprising a plurality of apertures for permitting fluid communication between a first and second area. The container further comprises an actuator associated with said second area, the fluid container comprising a valve member, a fluid container bottom, a valve member which is actuated by the actuator when the fluid container is situated in a first area, the container comprising a support for supporting the fluid container bottom a predetermined distance from the container bottom when the fluid container is positioned in the second area so that fluid from the fluid container may pass through the dividing wall into a first area until fluid in a second area achieves a desired fluid level which substantially corresponds to a predetermined distance.

In another aspect, this invention comprises a method for automatically watering at least one plant comprising the steps of filling a refillable fluid holder comprising a valve with water, situating the refillable fluid holder into a predetermined position in the plant container, and opening the valve so that water may flow through the valve until a plant area of the plant container is filled with a predetermined level of water which, in turn, is directly related to a predetermined position.

In still another aspect a method of watering a plant, comprising the steps of providing a container for receiving a plant in a plant receiving area and a fluid holder in a fluid holder receiving area, the aid fluid holder comprising a valve which is actuated to release fluid from the fluid holder receiving area to a plant receiving area when the fluid holder is mounted in the fluid holder receiving area until the fluid reaches a predetermined level, enabling a user to situate the fluid holder in the fluid holder receiving area to a predetermined position directly related to the predetermined level, so that the fluid reaches the predetermined level.

In yet another aspect this invention comprises an automatic plant watering system comprising a plant container, a refillable fluid holder for positioning in the container such that a controlled release of water from the refillable fluid holder to the plant container occurs when the refillable fluid holder is situated in the plant container.

An object of the invention is to provide a plant container having at least one wall defining both a plant-receiving area and a fluid container area for receiving a fluid container.

Another object of the invention is to provide a plant container which receives a fluid container such that when the fluid container is mounted in the plant container, an actuator on the plant container actuates a valve on the fluid container to automatically open the valve to permit water to pass from the fluid container to the plant-receiving area.

Still another object of the invention is to provide a method for automatically and conveniently water any plantation situated in a plant-receiving area by maintaining a water level in the plant-receiving area at a predetermined or desired level.

These and other objects and advantages of the invention will be apparent from the following description, the accompanying drawings and the appended claims.

BRIEF DESCRIPTION OF THE DRAWINGS

FIG. 1 is a perspective view of an automatic plant-watering system in accordance with one embodiment of the invention;

FIG. 2 is an illustration of the plant watering system shown in FIG. 1 with the fluid container removed from a fluid container receiving area;

FIG. 3 is a fragmentary sectional view illustrating the fluid container in an upside-down position so that water can be inserted into the container through a flapper valve;

FIG. 4 is a fragmentary sectional view of the container shown in FIG. 3 after it has been refilled with water showing the valve returned to a closed position so that the fluid in the container cannot escape until desired;

FIG. 5 is a sectional view of the automatic plant watering system shown in FIG. 1, taken along the line 5—5;

FIG. 8 is a view similar to FIG. 2, without a plant phantom in the container;

FIG. 9 is a front view of the embodiment shown in FIGS. 1 and 8;

FIG. 10 is a review view of the embodiment shown in FIGS. 1 and 8;

FIG. 11 is a right-side view of the embodiment shown in FIGS. 1 and 8;

FIG. 12 is a top view of the embodiment shown in FIGS. 1 and 8;

FIG. 13 is a bottom view of the embodiment shown in FIGS. 1 and 8;

FIG. 14 is another view of the embodiment shown in FIG. 6;

FIG. 15 is a front view of the embodiment shown in FIGS. 6 and 14;

FIG. 16 is a rear view of the embodiment shown in FIGS. 6 and 14;

FIG. 17 is a front view of the embodiment shown in FIGS. 6 and 14;

FIG. 18 is a top view of the embodiment shown in FIGS. 6 and 14;

FIG. 19 is a bottom view of the embodiment shown in FIGS. 6 and 14;

DESCRIPTION OF PREFERRED EMBODIMENT

Figure 6:
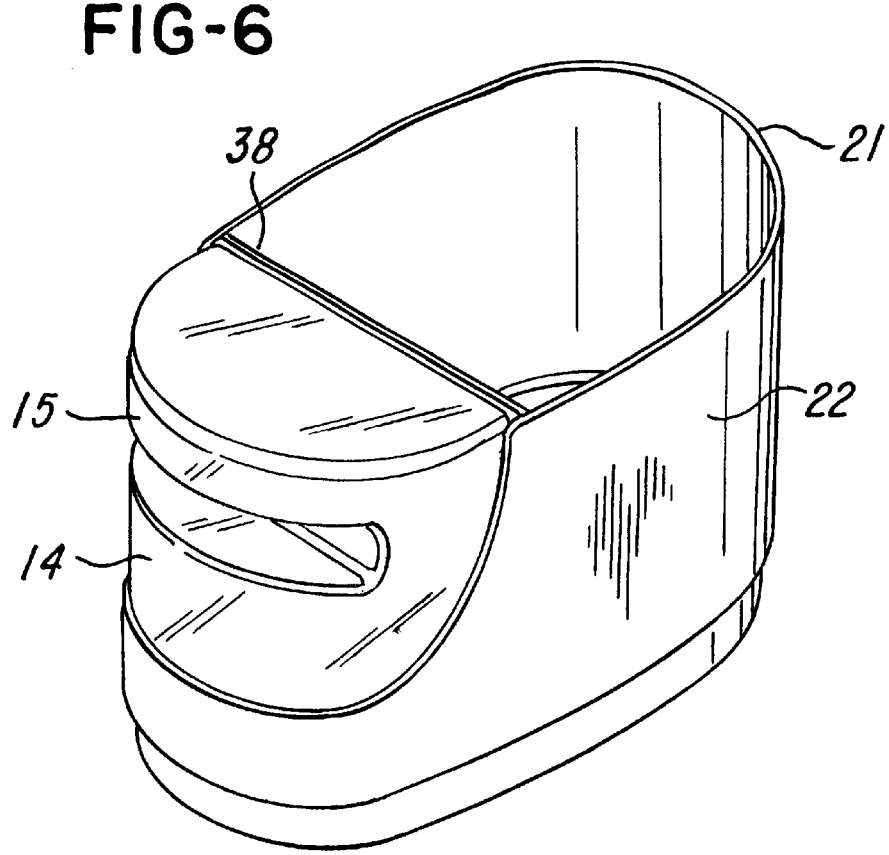
FIG. 6 is a perspective view of another embodiment of the invention.

Referring now to FIGS. 1–25, an automatic plant watering system 10 is shown comprising a plant holder or container 12 for receiving and holding a plant 13 and a refillable fluid holder or fluid container 14. As best illustrated in FIGS. 2–5, the automatic plant watering system 10 comprises an actuator 16 situated on a floor 18 of container 12. Notice in FIGS. 2 and 5 that the fluid container 14 comprises a valve member or valve 20 which may be actuated from a closed position (shown in FIGS. 2 and 4) to an open position shown in FIGS. 3 and 5. In the embodiment being described, the valve member 20 is a flapper valve having a first end 20a secured to a bottom 14a of fluid container 14 using conventional means, such as a rubber, waterproof cement or the like.

As illustrated in FIGS. 1, 2 and 8–13, the container 12 comprises at least one outer wall 21 comprising a plurality of wall segments, such as segments 22–36, which in the illustration shown is hexagonal. As illustrated in FIGS. 6 and 14–19, the at least one outer wall 22 may define a continuous circular, octagonal, multi-sided or elliptical shape. Alternatively, the container could be configured to have a rectangular shape (FIGS. 7, and 20–25) or any desired shape capable of performing the automatic watering as embodied in the invention described herein.

Note that the container 12 comprises at least one dividing wall 38 for dividing the container 12 to define a first area or plant receiving area 40 and a second area or refillable fluid holder or fluid container area 42 for receiving the receivable fluid holder or fluid container 14. The dividing wall 38 comprises a plurality of apertures 44 to permit fluid to pass from said container 14 in said receiving area 42 to said first area or plant-receiving area 40.

Figure 7:
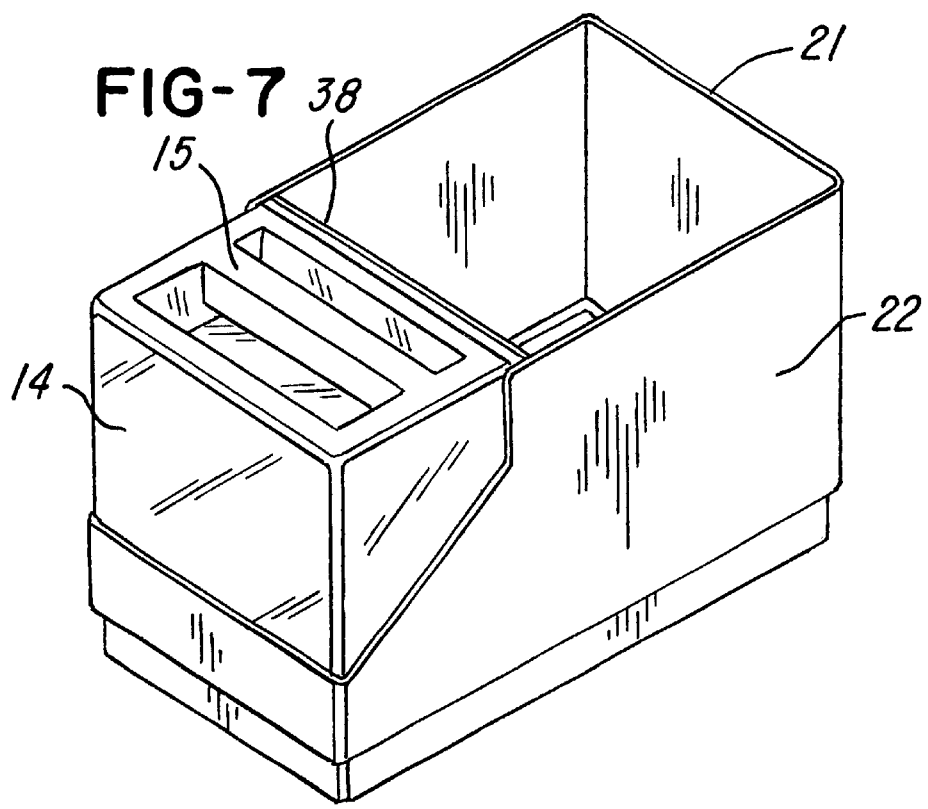
FIG. 7 is a perspective view of another embodiment of the invention.
Figure 20:
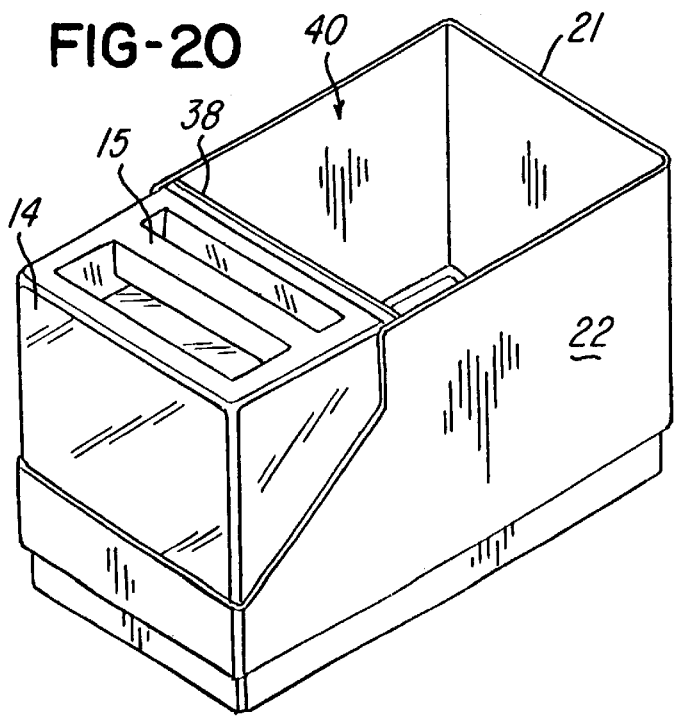
FIG. 20 is a perspective view similar to the view shown in FIG. 7.
Figure 21:
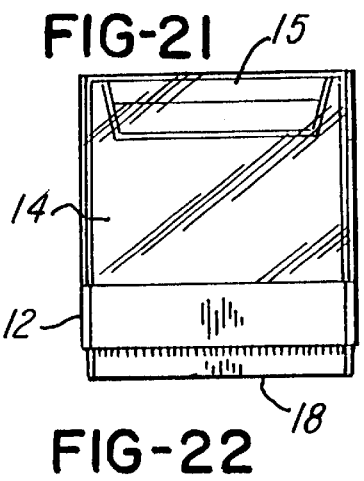
FIG. 21 is a front view of the embodiment shown in FIGS. 7 and 20.
Figure 22:
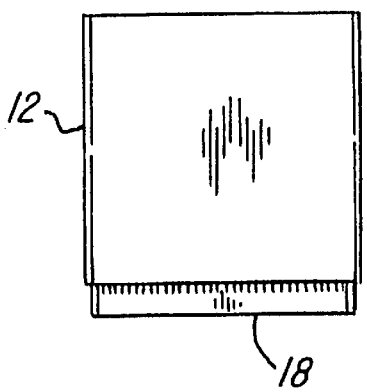
FIG. 22 is a rear view of the embodiment shown in FIGS. 7 and 20.
Figure 23:
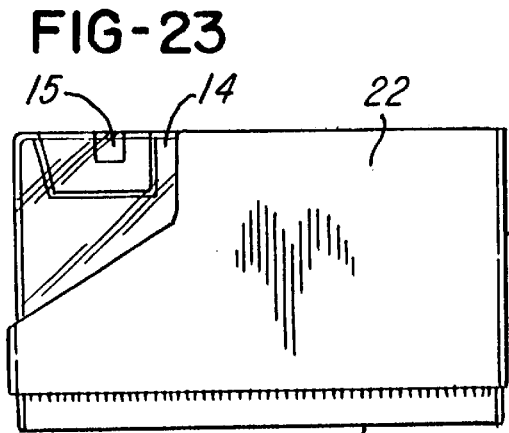
FIG. 23 is a right-side view of the embodiment shown in FIGS. 7 and 20.
Figure 24:
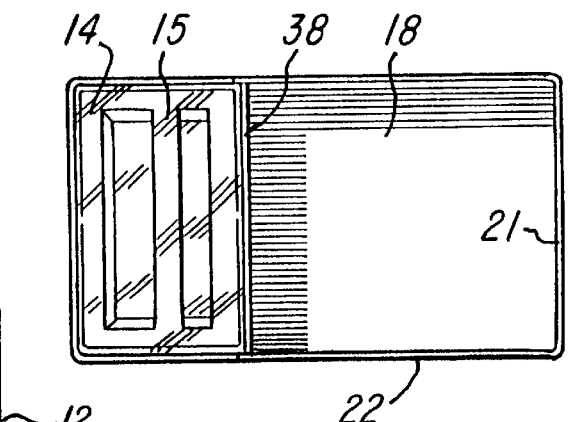
FIG. 24 is a top view of the embodiment shown in FIGS. 7 and 20.
Figure 25:
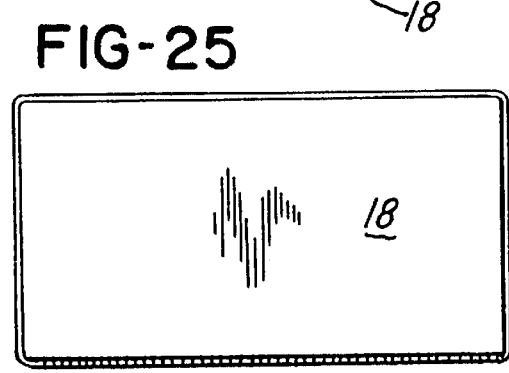
FIG. 25 is a bottom view of the embodiment shown in FIGS. 7 and 20.

As best illustrated in FIGS. 1, 2 and 8–13, the plurality of wall segments 22–36 or outer wall 21 define a fluid container receiving area 42 having a predetermined shape, such as a hexagonal shape (FIGS. 1 and 8), half-circle (FIG. 6) or rectangular shape (FIGS. 7 and 20). As mentioned earlier, the outer wall 21 and/or wall segments 22–36, could be configured to define any desired shape and the fluid container 14 would preferably define a shape which complements the shape of the area 42. This facilitates aligning the fluid container 14 in the area 42 so that, when the fluid container 14 is situated in the area 42, the flap valve 20 becomes operatively aligned with the actuator 16. This, in turn, causes the actuator 16 to engage and open flap valve 20, as illustrated in FIG. 5.

As is also illustrated in FIG. 5, the container 12 comprises at least one support member 44 which, in the embodiment being shown, is an L-shaped ledge which engages an outer bottom surface 14b of fluid container 14 in order to support the bottom surface 14b a predetermined distance D above surface 18a of bottom 18. It should be appreciated that the bottom surface 14b and surface 18a of bottom 18 cooperate to define a water transfer area 46 in which water is received from fluid container 14 before it passes through openings 44 and into plant-receiving area 40.

During operation, negative pressure or vacuum is experienced in area 48 of fluid container 14, while atmospheric pressure (labeled AP in FIG. 5), the fluid level is maintained at the predetermined level (identified by double arrow PD in FIG. 5).

In the embodiment being described, it is preferable that this predetermined distance be less than about 6" and with most plants it is desired to have the predetermined distance less than 2". It has been found that with certain plants, such as deciduous, evergreen, tropicals, flowering house plants, vegetables, herbs and the like, it is desired to keep the predetermined distance at least ½ but less than 1½.

It should also be appreciated that the distance D (FIG. 5) is substantially equal to the predetermined distance, and that the predetermined distance varies directly with the distance D. Thus, adjusting the position of fluid container 14, the distance D in FIG. 5 can be adjusted in order to adjust the predetermined distance PD. This is desirable when it is necessary to change the amount of fluid given to a plant depending on the specific requirements for the plant being situated in the plant-receiving area 40.

In the embodiment being described, the container 12 and fluid container 14 are each one-piece constructions molded from plastic. Notice that the fluid container comprises a convenient handle 15 (FIG. 2) so that the container can be lifted in the direction of arrow A (FIG. 1), turned upside down as illustrated in FIG. 3, and filled or refilled with water through a hose, spout, or nozzle 50 as shown. When the nozzle 50 is removed in the direction of arrow B, the flap 20 is resiliently biased to move into the direction of arrow C in order to seal the opening 52 in the bottom 14a of fluid container 14 so that, when the container is again turned upright as illustrated in FIG. 4, the flap valve 20 becomes closed so that the fluid will not escape. The filled or refilled container may then be inserted into the fluid container receiving opening 42 (FIG. 2) and inserted downward until the bottom 14b of container 14 engages the support member 44.

As alluded to earlier herein, during this situating operation, an end 16a of actuator 16 engages flap valve 20 to open it so that fluid can escape from the container 14 into the area 46 and ultimately into the plant-receiving area 40 until the level of fluid in the plant-receiving area 40 rises to the predetermined level or predetermined distance PD.

FIGS. 8–13, 14–19 and 20–25 illustrate various views of the embodiments shown in FIGS. 1, 6 and 7, respectively. It should be appreciated that the same part numbers are used for corresponding parts.

Advantageously, this system provides both a system and method for filling a refillable fluid holder 14 comprising a flapper valve 20 with a fluid, such as water, and possibly nutrients. The refillable fluid holder or fluid container 14 may then be situated into a predetermined position in the container 12 which, in turn, permits opening the valve 20 so that water may flow through the valve 20 into the plant-receiving area 40 where a plant, such as plant 13 (FIG. 1) can automatically be exposed to the predetermined level of fluid which corresponds to the amount of water required to adequately hydrate the plant 13. Conveniently, the system and method of the present invention enable both the opening of the valve 20 to occur substantially simultaneously with the situating of the refillable fluid holder or fluid container 14 into the predetermined position in the plant container 12.

Although not shown, it is envisioned that the apparatus and method of the present invention could be used with adjustable or removable support members (not shown), such as one or more blocks, which can be situated in said area 46 (FIG. 5) in order to adjust the distance D so that the predetermined distance PD is likewise adjusted.

Although not show, it should be appreciated that the fluid container 14 may have a reclosable lid on a top side 14c (FIG. 1) for filling the container 14 with water. It should be appreciated, however, that during the refilling process, the container 15 would have to be lifted in the direction of arrow A (FIG. 1) until the flapper valve 20 moves to the closed position (shown in FIGS. 2 and 4). After refilling, the lid on the top surface 14c can be reclosed so that water does not simply escape into the plant-receiving area upon refilling.

Advantageously, this system and method provides a convenient two-piece construction which facilitates reducing maintenance time and extending the useful life of the plants 13. Also, more than one container 14 could be used, and the containers 14 could be provided so that they are disposable, so that consumers simply buy a prefilled container of fluid which is discarded after use.

While the method described herein, and the form of apparatus for carrying this method into effect constitute preferred embodiments of this invention, it is to be understood that the invention is not limited to this precise method and form of apparatus, and that changes may be made in either without departing from the scope of the invention which is defined in the appended claims.

What is claimed is:

1. An automatic plant watering system comprising
   a plant container having a bottom for supporting plant material including at least one plant in a plant receiving area;
   a refillable fluid holder for positioning in said plant container such that a controlled release of water from said refillable fluid holder to said plant container; and
   said refillable fluid holder comprising at least one opening and a valve associated with said opening to permit fluid to flow through said opening and also for permitting fluid communication between said refillable fluid holder and said plant receiving area so that fluid fills said plant container to a predetermined level until said fluid hydrates at least one plant from beneath said plant when said refillable fluid holder is situated in said plant container.

2. The automatic plant watering system as recited in claim 1 wherein said plant container comprises an actuator which actuates said valve when said refillable fluid holder is situated in said plant container.

3. The automatic plant watering system as recited in claim 1 wherein said plant container comprises a plant area and a support which supports a bottom of said refillable fluid holder such that fluid fills said plant area with fluid to said predetermined level.

4. The automatic plant watering system as recited in claim 3 wherein said predetermined level is less than 2 inches.

5. The automatic plant watering system as recited in claim 1 wherein said predetermined level is at least ½ inch but less than 1½ inches.

6. The automatic plant watering system as recited in claim 1 wherein a vacuum is created in said refillable fluid holder when said refillable fluid holder is mounted in said plant container.

7. An automatic plant watering system comprising:
   a plant container; and
   a refillable fluid holder for positioning in said container such that a controlled release of water from said refillable fluid holder to said plant container occurs when said refillable fluid holder is situated in said plant container;
   said plant container comprises said refillable fluid holder comprises a valve and said plant container comprises an actuator which actuates said valve to open the valve when said refillable fluid holder is situated in said plant container;
   said valve comprises a flap.

8. The automatic plant watering system as recited in claim 7 wherein said flap is mounted to said refillable fluid holder and permits water to enter and exit said refillable fluid holder.

9. The automatic plant watering system as recited in claim 8 wherein said actuator comprises a post mounted to said refillable fluid holder so that when said refillable fluid holder is positioned in said plant container, said actuator engages and opens said flap.

10. The automatic plant watering system as recited in claim 1 wherein said plant container comprises a plurality of walls comprising a plurality of wall segments.

11. The automatic plant watering system as recited in claim 1 wherein said plurality of walls comprises at least one outer wall comprising an endless outer wall.

12. The automatic plant watering system as recited in claim 1 wherein said predetermined level in said plant container is approximately the same as the level at which a bottom of said refillable fluid holder is supported above said bottom of said plant container.

13. The automatic plant watering system as recited in claim 1 wherein said plant container and said refillable fluid holder are each an one-piece plastic construction.

14. The automatic plant watering system as recited in claim 10 wherein said plurality of wall segments define a refillable fluid holder area within said plant container, said plurality of wall segments defining a predetermined shape and said refillable fluid holder having a shape which complements said predetermined shape.

15. The automatic plant watering system as recited in claim 14 wherein said predetermined shape is a half circle, full circle, rectangle, square, hexagonal, octagonal or multi-sided shape.

16. The automatic plant watering system as recited in claim 1 wherein a position of said refillable fluid holder is adjustable relative to said bottom of said plant container in order to adjust a fluid level in said plant container.

17. The automatic plant watering system as recited in claim 16 wherein said system further comprises a plurality of stops for adjusting said position.

18. An automatic plant watering system comprising:
    a container comprising a container bottom and a plurality of walls defining a first area for receiving soil and a second area for receiving a refillable fluid holder, said plurality of walls comprising a dividing wall for separating said first area from said second area, said dividing wall comprising a plurality of apertures for permitting fluid communication between said first and second areas;
    said container further comprising:
    an actuator associated with said second area;
    said refillable fluid holder comprising:
    a valve member which is caused to be opened by said actuator when said fluid container is situated in said second area;
    said container further comprising a support for supporting a fluid holder bottom a predetermined distance from said container bottom when said refillable fluid holder is positioned in said second area so that fluid from said refillable fluid holder may pass through said dividing wall into said first area until said fluid fills said first area to hydrate said soil underneath a top of said soil until said fluid achieves a desired fluid level that substantially corresponds to said predetermined level.

19. The automatic plant watering system as recited in claim 18 wherein said predetermined distance is less than 6 inches.

20. The automatic plant watering system as recited in claim 18 wherein said predetermined distance is less than 2 inches.

21. The automatic plant watering system as recited in claim 18 wherein said predetermined distance is at least ½ inch but less than 1½ inches.

22. The automatic plant watering system as recited in claim 18 wherein a vacuum is created in said fluid container when said fluid container is mounted in said first area.

23. The automatic plant watering system as recited in claim 18 wherein said valve member comprises a flap.

24. The automatic plant watering system as recited in claim 23 wherein said flap is mounted to said fluid container bottom.

25. The automatic plant watering system as recited in claim 23 wherein said actuator comprises a post mounted to said container bottom in opposed relation to said flap so that when said fluid container is positioned in said first area, said actuator engages and opens said flap.

26. The automatic plant watering system as recited in claim 18 wherein said plurality of walls comprise at least one outer wall comprising a plurality of wall segments.

27. The automatic plant watering system as recited in claim 18 wherein said plurality of walls comprises at least one outer wall comprising a single outer wall.

28. The automatic plant watering system as recited in claim 18 wherein said desired fluid level is equal to said predetermined distance.

29. The automatic plant watering system as recited in claim 18 wherein said container and said fluid container are each an one-piece plastic construction.

30. The automatic plant watering system as recited in claim 26 wherein said plurality of wall segments define said second area to have a predetermined shape, said fluid container having a shape which complements said predetermined shape.

31. The automatic plant watering system as recited in claim 30 wherein said predetermined shape is a half circle, full circle, rectangle, square, hexagonal, octagonal or multi-sided.

32. A method for automatically watering at least one plant comprising the steps of:
    filling water through an opening of a one-piece refillable fluid holder comprising a valve associated with said opening;
    situating said refillable fluid holder into a plant container having a bottom that supports plant material; and
    said situating step causing said valve to engage an actuator that opens said valve so that fluid may flow through said valve from said refillable fluid holder into a plant area of said plant container until said fluid reaches a predetermined level;
    said fluid filling said plant areas from beneath a top surface of said plant material and being maintained at substantially said predetermined level as said fluid hydrates said plant.

33. The method as recited in claim 32 wherein said opening step is effected during said situating step.

34. A method for automatically watering at least one plant comprising the steps of:
    filling water through an opening of a one-piece refillable fluid holder comprising a valve associated with said opening;
    situating said refillable fluid holder into a predetermined position in said plant container, and
    said valve engaging an actuator during said situating step which opens said valve so that water may flow through said valve until a plant area of said plant container is filled to a predetermined level of water which, in turn, is directly related to said predetermined position; and
    said valve is a flapper valve.

35. A method of watering a plant, comprising the steps of:
    providing a container for receiving plant material including a plant in a plant receiving area and a fluid holder in a fluid holder receiving area, said fluid holder comprising a valve which is actuated when said fluid holder is placed into said container to release fluid from said fluid holder receiving area to said plant receiving area when said fluid holder is mounted in said fluid holder receiving area until said fluid reaches a predetermined level;
    enabling a user to situate said fluid holder in said fluid holder receiving area to a predetermined position directly related to said predetermined level, so that fluid fills said plant receiving area from beneath a top surface of said plant material until said fluid reaches said predetermined level;

said fluid holder causing said fluid to be maintained at substantially said predetermined level as the plant consumes said fluid.

36. The method as recited in claim 35 wherein said method further comprises the step of:

providing a container having a wall which divides said plant receiving area from said fluid holder receiving area.

37. The method as recited in claim 35 wherein said wall comprising a plurality of holes to permit fluid to pass from said fluid holder receiving area to said plant receiving area.

38. A method of watering a plant, comprising the steps of:

providing a container for receiving a plant in a plant receiving area and a fluid holder in a fluid holder receiving area, said fluid holder comprising a valve which is actuated by placing said fluid holder into said container to release fluid from said fluid holder receiving area to said plant receiving area when said fluid holder is mounted in said fluid holder receiving area until said fluid reaches a predetermined level;

enabling a user to situate said fluid holder in said fluid holder receiving area to a predetermined position directly related to said predetermined level, so that said fluid reaches said predetermined level; and providing a fluid holder having a flap valve on a bottom thereof so that said fluid holder can be filled when removed from said container and which opens when said fluid holder is situated in said fluid holder receiving area.

39. The automatic plant watering system as recited in claim 14 wherein said plurality of walls further define a shape that complements a shape defined by an outer wall of said refillable fluid holder.

40. The automatic plant watering system as recited in claim 18 wherein said desired fluid level is substantially the same as said predetermined distance.

41. The automatic plant watering system as recited in claim 26 wherein said plurality of walls define a shape that complements a shape defined by an outer wall of said refillable fluid holder.

42. The method as recited in claim 36 wherein said container comprises an outer wall which cooperates with said wall to define a shape that complements the shape of said fluid holder to facilitate a user's alignment and positioning of said fluid holder in the container.

43. The automatic plant watering system as recited in claim 18 wherein a pressure in said refillable fluid holder is less than a pressure in said plant container.

44. The automatic plant watering system as recited in claim 1 wherein said opening is situated in a bottom surface of said refillable fluid holder.

45. The automatic plant watering system as recited in claim 7 wherein said opening is situated in a bottom surface of said refillable fluid holder.

46. The automatic plant watering system as recited in claim 18 wherein said opening is situated in a bottom surface of said refillable fluid holder.

47. The automatic plant watering system as recited in claim 32 wherein said opening is situated in a bottom surface of said refillable fluid holder.

48. The automatic plant watering system as recited in claim 1 wherein said refillable fluid holder comprises an integrally molded handle.

49. The automatic plant watering system as recited in claim 7 wherein said refillable fluid holder comprises an integrally molded handle.

50. The automatic plant watering system as recited in claim 18 wherein said refillable fluid holder comprises an integrally molded handle.

51. The automatic plant watering system as recited in claim 32 wherein said refillable fluid holder comprises an integrally molded handle.

\* \* \* \* \*